Jan. 1, 1935.  W. H. FULWEILER  1,986,333
PREVENTION OF GUM FORMATION IN GAS DISTRIBUTION SYSTEMS
Filed Dec. 17, 1928
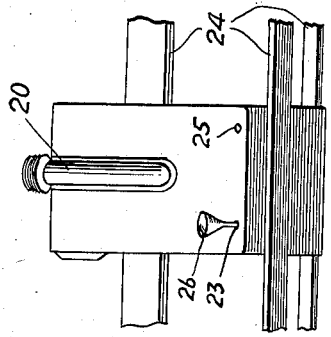
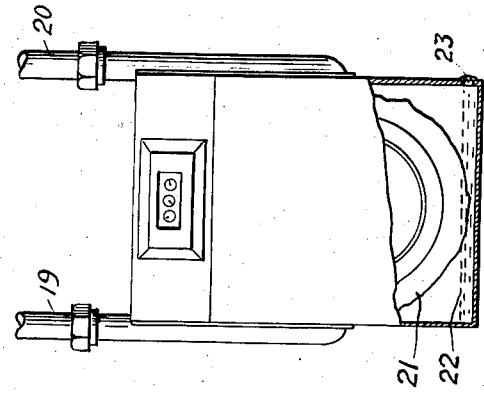
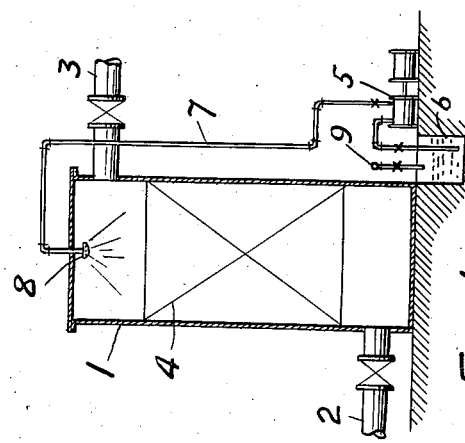
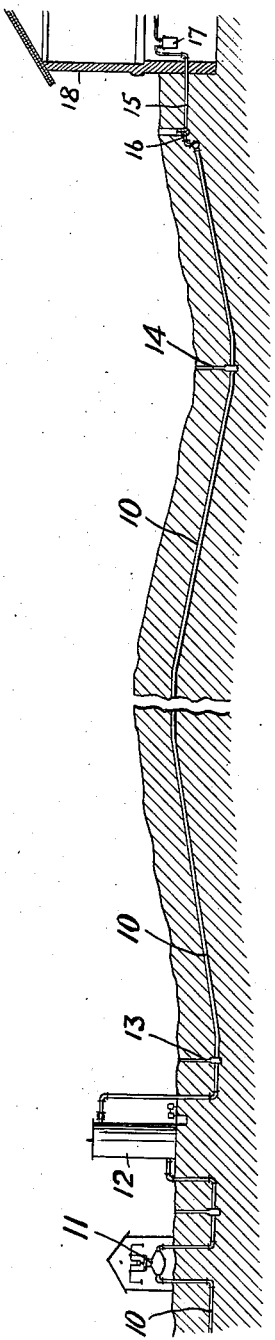
WITNESS:
INVENTOR
Walter H. Fulweiler
BY
Augustus B. Stoughton.
ATTORNEY.

Patented Jan. 1, 1935

1,986,333

UNITED STATES PATENT OFFICE 1,986,333

PREVENTION OF GUM FORMATION IN GAS DISTRIBUTION SYSTEMS

Walter H. Fulweiler, Wallingford, Pa., assignor to The United Gas Improvement Company, Philadelphia, Pa., a corporation of Pennsylvania Application December 17, 1928, Serial No. 326,711

6 Claims. (Cl. 48—190)

The present invention relates to the distribution of combustible gas for domestic or industrial consumption such as carburetted water gas or producer gas.

In such distribution one of the difficulties that is encountered is the formation of gummy deposits in the mains, service pipes, meters, pumps, pilot lights and other portions of the distribution system.

These deposits result from the oxidation or polymerization of potential gum forming hydrocarbons in the gas being distributed, principally indene and styrene.

There have been numerous proposals for removing the gum forming compounds from the gas prior to distribution. Among them may be mentioned refrigeration to condense out the light oil fractions containing them, and removal by scrubbing with oil. These methods are open to the objection that the gum forming compounds have considerable calorific value and their removal with the light oil containing them, reduces the calorific value of the gas.

It has also been proposed to operate the gas manufacturing process so that only small amounts of these gum forming compounds are produced. Unfortunately this cannot be done without sacrificing efficiency.

According to the present invention the potential gum forming compounds are not removed from the gas but their tendency to form gums in the distribution system is overcome or at least greatly reduced. My invention may also be applied, if desired, to prevent or greatly reduce the gum formation in certain parts of the distribution system instead of the whole system.

I have found that the addition to the gas of small quantities of the mono or poly hydric derivatives of benzene or its homologs, (for instance cresol, hydroquinone or pyrogallol) will prevent or reduce to a marked extent the formation of gums, although relatively large quantities of potential gum forming compounds may be present.

The quantity of styrene and indene in the gas may be 0.05 lbs. and upward per 1000 cu. ft. of gas. The quantity of the gum forming compounds in the gas may vary considerably. If cresol is to be added to the gas the quantity added may be 2% of the combined quantity of indene and styrene. If pyrogallol is to be added the quantity may be .05% of the quantity of styrene and indene in the gas or both pyrogallol and cresol may be added in the above quantities. These quantities are purely illustrative and we do not wish to be limited to these particular quantities.

The mono or poly hydric derivatives of benzene or its homologs may be added by employing any suitable apparatus, or method, modified as necessary to suit the vapor pressure of the particular derivative employed. Merely for illustration the gas may be passed through a chamber into which the gum forming inhibitor is sprayed.

If cresol is to be added to the gas it may be sprayed in as a liquid which vaporizes in the gas. If cresol and pyrogallol are to be used together they may be sprayed in as a solution of the pyrogallol in cresol. If the pyrogallol is to be used alone the gas may be allowed to pass over a bed of it maintained at the temperature necessary to vaporize the required quantity.

The cresol and pyrogallol act as negative catalysts to retard the reaction velocities of the polymerization and oxidation of the styrene, indene and other gum forming hydrocarbons such as butadiene and cyclopentadiene. The cresol and pyrogallol may unite with a portion of the small quantity of oxygen present in the gas and thus prevent the oxygen from combining with the hydrocarbons.

In distribution systems in which meters of the dipping type are used, in which the meter diaphragm dips into a bath of oil, considerable trouble is caused by the absorption, by the meter oil, of potential gum forming compounds, from the gas. Their subsequent oxidation or polymerization to gums causes sticking meter valves and hardening of the diaphragm. The result is a very considerable expense for meter repairs, as well as loss due to low registering of the meter.

I have found that the addition of small quantities of the above mentioned mono or poly hydric derivatives of benzene or its homologs to the meter oil, will prevent or at least materially reduce the formation of gums, although the potential gum forming compounds are absorbed by the meter oil as before.

Fig. 1 shows a vertical cross-section of a chamber through which gas passes to the distribution system and into which the inhibitor is sprayed.

Fig. 2 shows a somewhat diagrammatic view of a portion of a gas distribution system.

Fig. 3 shows a partial front elevation and partial vertical cross-section of a dipping meter.

Fig. 4 shows a meter and illustrates a method of adding the inhibitor to the meter oil.

Referring to Fig. 1, 1 generally indicates a chamber provided with the gas inlet 2 and the gas outlet 3. 4 indicates packing material which may be provided. 5 indicates a pump which pumps the inhibitor from the sump 6 by way of the line 7 to the spray 8, which discharges a fine spray into the chamber, saturating the packing 4. 9 indicates a means for supplying the inhibitor to the sump.

In operation, the gas passes through the inlet 2 and upward through the packing 4 to the outlet 3 leading to the distribution system. In passing through the packing and the upper portion of the chamber, the gas is contacted with the inhibitor and the inhibitor is vaporized into the gas, the vapors passing with the gas into the distribution system.

Because of the small quantity of inhibitor required, the most convenient way of introducing it into the chamber, and into the gas as a vapor, is to add the small required quantity of inhibitor to a much larger volume of oil in the sump 6, supplying the oil containing the inhibitor to the spray, and atomizing it in the chamber, where it is contacted with the gas and where the gas picks up vapors of the inhibitor and carries them thence into the distribution system.

Referring to Fig. 2, 10 generally indicates a gas main leading from a storage holder (not shown). 11 is a governor. 12 is the chamber of Fig. 1. 13 and 14 indicate drips. 15 is a service pipe; 16 a curb cock; and 17 a meter in a consumer's premises indicated at 18.

The chamber 12 may be arranged on the outlet of the governor as shown or on its inlet side.

In operation, the gas passes from the storage holder (not shown) through the governor which regulates the gas pressure, and thence through the chamber 12 in which the inhibitor is vaporized into the gas. From thence it passes through the main 10 to the service pipe 15 and into consumer's premises 18, and through the meter 17 to the appliances (not shown).

Condensation in the main flows to the drips 13 and 14 from which it may be pumped. As gum-forming compounds condense out of the gas with the drip oil, a portion of the vaporized inhibitor condenses out also, and prevents the formation of gums in the condensate. Some condensation may also take place in the meter, with the same inhibiting action by the inhibitor.

Referring to Fig. 3, this figure shows a meter provided with the gas inlet 19 and outlet 20. 21 indicates one of the leather meter diaphragms which dips into a pool of mineral oil indicated at 22. The oil is drawn up into the diaphragm by capillary action and keeps the leather pliable and gas-tight, preventing "bleaching" of the leather.

The oil is poured into the meter through openings such as 23, which are punched into the end of the meter and, while the meter is disconnected, closed by soldering after the oil has been put in.

Referring to Fig. 4, this figure shows the meter of Fig. 3 disconnected and tilted on a rack generally indicated as 24. 23 and 25 indicate the holes punched in the meter for the purpose of admitting the meter oil.

The inhibitor is admitted through these holes, either mixed or not with the meter oil, by any convenient means as by the funnel 26. The holes are soldered shut thereafter.

I claim:

1. The method of preventing gum formation in gas distribution systems distributing combustible gas containing hydrocarbon gum forming compound in the vapor phase which consists in vaporizing into the gas a small quantity of a compound belonging to the class of compounds consisting of the mono and poly hydric phenols, whereby the hydrocarbon gum forming compounds which subsequently condense out or are absorbed out of the gas in the distribution system are accompanied by the added compound and the conversion of the hydrocarbon gum forming compounds to gums is prevented.

2. The method of preventing gum formation in dipping gas meters when employed in a gas distribution system distributing combustible gas containing hydrocarbon gum forming compounds in the vapor phase which consists in adding small quantities of a compound belonging to the class of compounds consisting of the mono and poly hydric phenols, to the meter oil whereby the formation of gums from the hydrocarbon gum forming compounds subsequently absorbed from the gas by the oil is prevented.

3. The method of preventing gum formation in gas distribution systems distributing combustible gas containing hydrocarbon gum forming compound in the vapor phase, which process consists in contacting the gum forming compound of the combustible gas with mono or poly hydric derivatives of benzene or its homologs.

4. The method of preventing gas distribution system meter diaphragms from hardening, which method consists in causing the meter diaphragm to dip in a bath of oil in which gum will not form despite the absorption of gum forming compounds by the meter oil from the combustible gas.

5. The method according to claim 4 in which the oil contains mono or poly hydric derivatives of benzene or its homologs.

6. The method of preventing gum formation in gas distribution systems distributing combustible gas containing hydrocarbon gum forming compound in the vapor phase, which method consists in placing in those parts of the system in which the gum forming compound may be deposited, a small quantity of a compound belonging to the class of compounds consisting of the mono and poly hydric phenols, whereby the formation of gum from any gum forming compound which may be deposited is prevented.

WALTER H. FULWEILER.